Feb. 18, 1969   R. E. LEVIN ET AL   3,428,800
SPOTLIGHT LAMP

Filed Dec. 10, 1965   Sheet 1 of 2

ROBERT E. LEVIN
THOMAS M. LEMONS
   *INVENTORS*

BY
   *Laurence Burns*
      ATTORNEY

United States Patent Office 3,428,800
Patented Feb. 18, 1969

3,428,800
SPOTLIGHT LAMP
Robert E. Levin, Hamilton, and Thomas M. Lemons, Marblehead, Mass., assignors to Sylvania Electric Products Inc., a corporation of Delaware
Filed Dec. 10, 1965, Ser. No. 512,913
U.S. Cl. 240—41.3      2 Claims
Int. Cl. F21v *13/04*

ABSTRACT OF THE DISCLOSURE

An optical system for projection lamps comprising a light source positioned at one focus of an ellipsoidal reflector to form an image at the other focus and a Fresnel lens to project a beam of light from the image of the source and, in some cases, from the actual source. The light source and reflector are movable as a unit with respect to the lens. The reflector extends beyond the light source far enough so that the rays from the end of the reflector fall on the rim of the lens. Zones can be cut out of the reflector so that an oval image may be projected.

---

Figure 1:
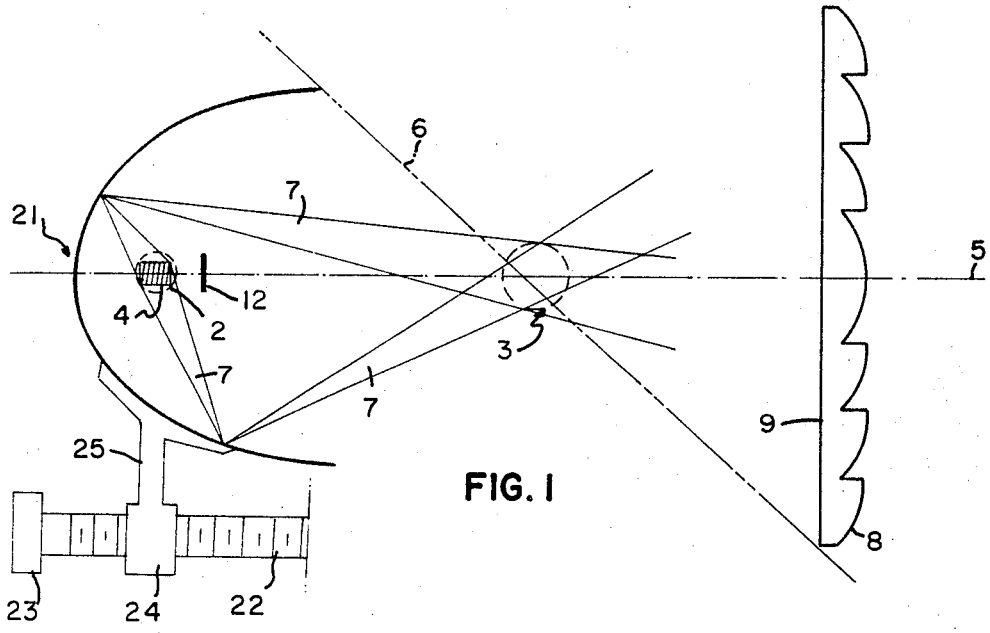

This invention relates to spotlight projectors and the like, especially to those in which the angle of the beam can be varied, although its usefulness is not limited to that type in all respects.

Such spotlights are used in theatre, photographic motion picture, television and other fields. The beam angle should generally be variable through a considerable range of angles, for example, it should be capable of a 2:1 variation or greater.

Variable beam spotlights have previously used an incandescent lamp having a filament in proximity to a simple positive lens, in some cases of the Fresnel type, usually with an approximately spherical reflector set behind the filament a distance approximately equal to the radius of the sphere. In some cases, the reflector was made of a diffusing type, which was quite inefficient. The filament was generally a series of tungsten coils set parallel to each other in a single plane or in two parallel planes. These were called monoplane and biplane filaments, respectively and quite appropriately. The reflector, whether diffuse or specular, passes some of the backwardly directed light back between the spaces in the filament plane or planes to increase somewhat the light emerging from the device.

Ellipsoidal reflectors have sometimes been used in spotlights, but only in those of the aperture types, with which we are not concerned here, and which are optically equivalent to film projectors; that is, the reflector and light source supply light to an aperture focused into image space ahead of the device itself.

Various other devices have been used to provide variation in beam angle for spotlights, but they were either costly and complicated or optically deficient in some respects.

It is accordingly an object of the present invention to provide a simple, inexpensive and effective spotlight having a variable beam. It is a further object to provide this without sacrificing the softness, edge cut-off, ease of variability, and adaptability to use with the usual hinged doors before the lens, often called simply "barn doors." It is a further object to achieve all this with a greatly increased efficiency that is, with an increase of light output for a given wattage of electrical input to the light source.

We have discovered that this can be accomplished by using a portion of an ellipsoid as a reflector with a coiled filament at one focus so that the approximate image at the other focus would be the source of light for a lens, the latter being preferably of the Fresnel type. This is much more efficient than the prior devices, partly because the image of the filament, being magnified, will increase the diameter of the bright portion of the lens.

The ellipsoidal reflector can extend considerably in front of the lamp to pick up as much light as possible from directions along which it would not otherwise reach the lens. The reflector can extend toward the lens until the point where the reflected ray crosses the optical axis of the reflector to just fall on the rim of the lens. Extending the reflector beyond this point will not be any more effective, because the light from the extended portion of the ellipsoid would not reach the lens, but would fall outside it.

To prevent any unevenness of the light pattern resulting from unreflected light coming directly from the filament, a shield can be placed in front of the filament, that is on the side of the filament nearest the lens.

The angle of the beam emitted from the lens can be varied by moving the reflector and filament, together, nearer to, or farther from the lens. In order to make the light pattern more uniform from point to point, it is generally desirable to peen or groove the reflector contour slightly, to soften the image of the filament.

The filament itself can be a coil or coiled-coil having its axis of the coil coincide with, or in parallel to, the major axis of the ellipsoid; there will be a minimum of light along the latter axis, and a shield for light emitted directly toward the lens will be less necessary. However, for some purposes, the filament can be used with its axis perpendicular to the major axis of the ellipsoid. If in such a case, small pieces of the reflector are cut out along that perpendicular axis, the light pattern produced by the device will be oval-shaped, instead of circular, and an oval-shaped pattern is desirable for some purposes. The total light output from the device, for a given power input to the filament, will be smaller for the perpendicular position of the filament.

Other light sources of suitable shape can be used instead of the incandescent filament described above.

Figure 2:
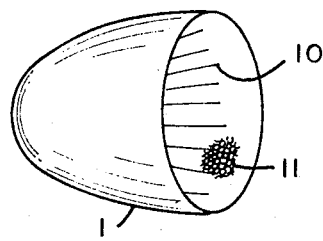
Figure 3:
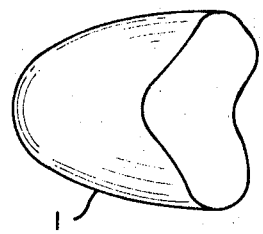
Figure 4:
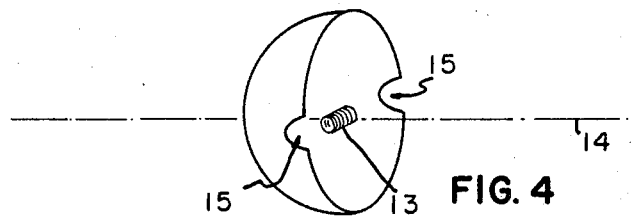
Figure 5:
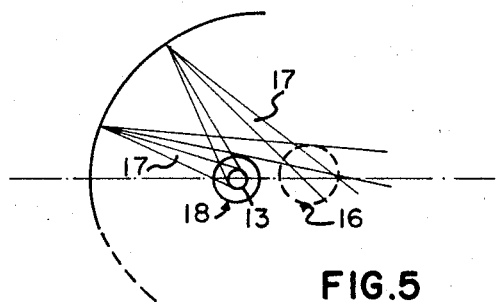
Figure 6:
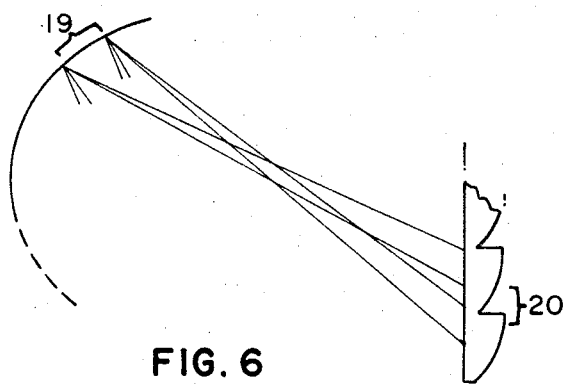

Other objects, features and advantages of the invention will be apparent from the following specification, taken in connection with the accompanying drawing in which:

FIGURE 1 is a schematic drawing of a device according to the invention.
FIGURE 2 is a drawing of a reflector.
FIGURE 3 is a drawing of another reflector.
FIGURE 4 is a schematic drawing of a reflector with lateral filament.
FIGURE 5 is a schematic drawing of typical light rays reflecting from a reflector.
FIGURE 6 is a schematic drawing of typical light rays from a reflector to a lens.

FIGURE 1 shows the reflector 1 which is an ellipsoid or a surface with a section nearly that of an ellipse so that it concentrates energy from one small region or space 2 to another small region or space 3. The luminous source is an incandescent coil 4 as illustrated or any other luminous source such as an arc discharge. The source has reasonable symmetry about the optic axis 5. The emitted luminous flux of the lamp is gathered through a large solid angle centered on the source and subtended by the reflector surface. The efficiency of the system increases throughout the useful design range as the distance between "focal points" increases. The reflector surface is useful only up to the line 6 drawn from an edge of the lens and passing through the top of region 3 when the unit is adjusted for the widest flood beam. This flux is restricted through the small region or space 3 ahead of the lamp. Typical cones of light 7 are illustrated. Since these basic cones appear to emanate from the region 3, region 3 is an apparent source to the lens 8. The lens is typical of the well-known Fresnel type lenses used in theatrical equipment and needs no further description.

Small amounts of diffusion control may be incorporated on the rear surface 9 of the lens to "soften" the beam. The reflector may have radial grooving 10 as shown in FIGURE 2 for the purpose of spreading light in a sagittal plane without affecting the meridian plane distribution. This provides leeway in locating sources with small cross sections normal to the optic axis. As shown in FIG. 2 small spheric or approximately spheric indentations 11 called "peens" may be used to spread the light from the reflector over small zones without general diffusion that would increase system losses. This can have the purpose of smoothing out minor striations from source lumiance non-uniformities such as those of incandescent filaments. They can also be used to produce a somewhat "softer" beam. Either the peens or grooves will produce small variations in the direction of each pencil or light from the reflector with spreading it out of the system, as any process of general diffusion would.

Most practical axial sources have little radiation directly toward the lens. If any specific source does, a mask 12 may be used to block this component. This prevents the lens from "seeing" two sources at different focal distances, which usually will produce a hot spot at the center of the beam. The complete axial symmetry produces a symmetric beam. The beam may be made oval by cutting the front of the reflector with a curved surface rather than by a plane perpendicular to the optic axis. Supch a reflector for an oval beam is shown in FIGURE 3.

The region 3 is between the lens and its back focal point. This prevents a real image of the source from forming in image space ahead of the luminaire. Also, if a position to the rear of the back focal point were used for the same beam spread, a lower luminaire efficiency would exist.

An explanation of the increased intensity and efficiency can be made using the concept of luminous flux. If the true source were in the vicinity of region 3, the solid angle subtended at the source by the lens would be small, i.e., less than $2\pi$ steradians, and this is the solid angle zone of flux collection. When the true source is at 4, the flux is gathered through the solid angle subtended at the source by the reflector; this is a large solid angle, i.e., in excess of $2\pi$ steradians. The ratio of these solid angles can normally be made 2:1 or greater. Since all of the flux in each of the solid angles is utilized in the beam except for the small fraction lost at the reflecting surface, the source 4, in the position shown in FIG. 1, has produced a high efficiency and intensity.

An equivalent explanation can be made from the luminance concept. The reflector produces a magnified image of source 4 at region 3. The magnification factor varies for each element of the reflector surface, i.e., an ellipse is highly comatic. However, the quality of the image is immaterial since it is never formed to a real image in image space in front of the luminaire. The principle of the flooding operation is that the exit pupil of the luminaire is under-filled in flood settings; consequently the intensity is proportional to the source size. This enlarged image at 3 acts as a source to produce a greater beam intensity. Note that the over-all beam size is principally a function of the axial position of region 3 as long as the lens is the limiting stop of the system. Since the intensity has increased for a constant beam size, more flux is in the beam. Therefore the efficiency has increased along with the intensity.

The filament 4 will usually be inside a lamp bulb having a base at one end and which fits into a socket therefor, such sockets being readily available on the market, the socket being set in the apex 21 of reflector 1 which can have a hole cut in it for the socket. Such a lamp is shown for example in the copending U.S. patent application, Ser. No. 206,881, filed July 2, 1962, by Palermo et al., now Patent No. 3,321,662.

The filament 4 and reflector 1 can thus be moved as a unit, with respect to a lens, by conventional means for, example, a threaded rod 22 having a knob 23 for turning it, the rod 22 being rotatable but fixed in position with respect to lens 9, as by turning in bearings mechanically connected to said lens 9, said rod 22 carrying the nut 24 attached to reflector 1 by bracket 25 extremely from the nut.

A second form of this invention consists of a source that is not orientated axially within the luminaire. The longest dimension of the source 13 is essentially normal to the optic axis 14 and shown in FIGURE 4. Many such sources such as double-ended tubular iodine lamps, have electrodes or electrical connections at both ends of the source and require sections of the reflector at each end of the source to be cut out as at 15. These cut outs 15 are not essential to the invention, but their presence is normal and accepted. Further if these cut outs are not present, these regions of the reflector still are usually not functional due to the low luminous radiation in these directions from a source normal to the optical axis 5. This reflector is designed to gather the source radiation over a large solid angle and return it to a small region of space 16, just ahead of the source 13 as shown in FIGURE 5 with typical cones 17 of light. This means that the reflector shape will be an ellipsoid with a low degree of eccentricity or a surface very similar to this ellipsoid. The particular design in any case would be selected to avoid passing an appreciable fraction of energy through the source envelope 18. Most of the energy would just pass around the envelope. If the reflector were the only source of radiation to the lens a dark zone 19 on the reflector as shown in FIGURE 6 would produce a dark area 20 on the lens; dark zones on the reflector will occur due to end effects of the source, electrical connections, mechanical supports, et cetera. This dark area of the lens 20 will produce a corresponding dark zone in the beam pattern since the beam is formed by a virtual source behind the lens and radiating through the free aperture of the lens. By designing this system so that the true source 13 is in proximity to the effective source 16, the true source will very nearly provide the luminous energy omitted by the reflector when viewing from a point such as 20 on the lens back toward the source-reflector combination. The final shape of the radiated light beam from this luminaire can be modified to some extent by shaping the opening of the reflector. Grooving or peening can be applied to this reflector for the purposes mentioned above.

The axial source version gave a gain in intensity, beam efficiency and field efficiency of approximately two times over conventional Fresnel units. This was true for all beam angles. The cross-axis source gave somewhat lower gains. However, it is still a high desirable design. It is useful with arc sources. Further, double-ended quartz iodine lamps can be used. It is the only system of these performance characteristics to effectively utilize the double-ended lamp. The use of the quartz iodine lamp gives significant gains over conventional gas filled lamps of the high colour temperature type. These conventional lamps have an average luminous output during life of approximately 70% of the initial rating. By the end of life the output is still further down. Also the bulb blackening deteriorates the effectiveness of the rear reflective element. On the other hand the quartz iodine lamp essentially has 100% maintenance throughout life.

Various modifications and variations of the embodiments described will be apparent to a person skilled in the art without departing from the spirit and scope of the invention as set forth in the appended claims.

What we claim is:

1. A spotlight comprising: a light source, a reflector in the form of a portion of an ellipsoid with the light source at one focus of the ellipsoid and within it, said reflector producing an approximate image of the light source at the other focus of the ellipse, a lens outside the reflector and capable of projecting a beam of light from said image as a light source, the reflector extended forward of the light source to a position at which the rays from the end of the reflector extend to the rim of the lens, and zones being cut out of said reflector at its open end, whereby an oval image is produced.

2. A spotlight comprising: a light source, a reflector in the form of a portion of an ellipsoid with the light source at one focus of the ellipsoid and within it, said reflector producing an approximate image of the light source at the other focus of the ellipse, a lens outside the reflector and capable of projecting a beam of light from said image as a light source, the reflector extended forward of the light source to a position at which the rays from the end of the reflector extend to the rim of the lens, and said source of light and said image being close enough together so that the lens outside of the reflector is capable of projecting a beam of light from said image and said light source simultaneously.

References Cited

UNITED STATES PATENTS

| | | | |
|---|---|---|---|
| 1,928,431 | 9/1933 | Morshead et al. | 240—41.3 |
| 2,057,278 | 10/1936 | Richardson | 240—44 |
| 2,576,875 | 11/1951 | Bergmans et al. | 240—41.3 |
| 2,578,451 | 12/1951 | Rex | 240—25 |
| 3,331,960 | 7/1967 | Elmer | 240—103 |

NORTON ANSHER, *Primary Examiner.*

R. M. SHEER, *Assistant Examiner.*

U.S. Cl. X.R.

240—44